United States Patent [19]

Justamante

[11] 4,120,477
[45] Oct. 17, 1978

[54] MOLD AND METHOD FOR INJECTION MOLDING A SOLE ONTO A SHOE UPPER

[75] Inventor: Juan Justamante, Hialeah, Fla.

[73] Assignee: Suave Shoe Corporation, Miami Lakes, Fla.

[21] Appl. No.: 800,659

[22] Filed: May 26, 1977

[51] Int. Cl.² ............................ B29C 1/00; B29F 1/12
[52] U.S. Cl. ...................................... 249/109; 264/244; 264/255; 425/119; 425/129 S; 425/130
[58] Field of Search ................. 264/244, 255, 245; 425/129 S, 119, 130; 36/14, 32 R; 12/142 RS; 249/105, 109

[56] References Cited

U.S. PATENT DOCUMENTS

| 3,510,914 | 5/1970 | Hujik | 425/129 S |
| 3,574,895 | 4/1971 | McIlvin | 425/119 |
| 3,682,579 | 8/1972 | Hujik | 425/129 S |

FOREIGN PATENT DOCUMENTS

2,029,108  10/1970  France .................................. 425/129 S

Primary Examiner—W.E. Hoag
Attorney, Agent, or Firm—Robert L. Thompson

[57] ABSTRACT

This invention is directed to a mold for injection molding a sole onto an upper made of textile, vinyl, suede, leather, or any other suitable materials in which the lower periphery of the sole slopes downwardly and inwardly and forms a downwardly extending continuation of the peripheral face of the bumper. The mold is capable of using a single sole plate to produce a shoe in which the bumper and integral first sole part is formed of one color, a second sole part is formed of another color and the periphery of the second sole part is visible from the sides and ends of the shoe beneath the bumper. The upper surface of the sole plate of the mold includes an upstanding peripheral fin. The sole plate is capable of producing a skid-resistant surface on the bottom of the second sole part.

4 Claims, 13 Drawing Figures

MOLD AND METHOD FOR INJECTION MOLDING A SOLE ONTO A SHOE UPPER

BACKGROUND OF THE INVENTION

There has been a long-felt need for a mold and method for injection molding a sole onto an upper made of textile, vinyl, suede, leather on any other suitable materials by which a shoe is produced very economically in which the lower periphery of the sole slopes downwardly and inwardly and forms a downwardly extending continuation of the peripheral face of the bumper. In addition, the mold should be capable of using a single sole plate to produce a shoe in which the bumper and integral first sole part is formed of one color of injection molding material and a second sole part is formed of another color of injection molding material with the periphery of the second sole part visible from the sides and ends of the shoe beneath the bumper to provide an attractive two-color exterior appearance for the bumper and the second sole part. Furthermore, the upper surface of the sole plate should be capable of producing a skid-resistant surface on the bottom surface of the sole.

While DiPaolo U.S. Pat. No. 3,806,974 discloses a mold and method for injection molding a sole onto a textile upper using a single sole plate to produce a shoe in which the bumper and an integral first sole part is formed of one color of injection molding material and a second sole part is formed of another color of injection molding material and in which the surface of the sole plate is capable of producing a skid-resistant surface on the bottom surface of the sole, the lower periphery of the DiPaolo's sole does not slope downwardly and inwardly and does not form a downwardly extending continuation of the peripheral face of the bumper. Furthermore, the periphery of DiPaolo's second sole part is not visible from the sides and ends of the shoe.

British Pat. No. 1,173,260 discloses a relatively expensive method of making a shoe in which the sole plate or plunger 11 is moved upwardly to compress the injection molding material after each injection step. Like DiPaolo, the lower periphery of the sole produced by the mold and method of this patent does not slope downwardly and inwardly and its second sole part is not visible from the sides and ends of the shoe in the embodiment of FIG. 3.

A shoe has been manufactured and sold by Puma of Germany and imported and sold in this country by Beconta Inc. which has a leather upper, a white vulcanized rubber bumper and first sole part and a blue vulcanized rubber second sole part beneath the bumper and first sole part. The second sole part has a skid-resistant bottom surface. Two different sole plates are used to produce the Puma shoe, one to produce the white bumper and integral first sole part and another to produce the blue second sole part which has a surface capable of producing the skid-resistant bottom surface of the second sole part.

With Puma, the combined bumper and first sole part and the second sole part are first manufactured using two sole plates and this process consumes about 2½ minutes. Then the combined bumper, first sole part and second sole part are attached to the upper by cement and this is a very time consuming step.

With my mold and process, only about 2-½ seconds are required to mold the combined bumper and first sole part, about 56 seconds to cool it and cause it to adhere to the bottom of the lasted upper, only about 2½ seconds to mold the sole part and about 36 seconds to cool it, making a total elapsed time of one minute and 37 seconds with no time consuming cementing step.

Consequently the Puma shoe is much more expensive to manufacture than a shoe made by the mold and method of my invention.

Tusa et al U.S. Pat. No. 3,441,643 discloses a well known prior art method and mold for injection molding a sole onto a textile upper but the Tusa et al patent produces only a single layer sole and the Tusa mold and method are relevant only to show a well known prior art method which has been extensively used in the United States for many years.

The above described prior art is the closest prior art to the mold and method of this invention of which I am aware.

BRIEF SUMMARY OF THE INVENTION

One object of this invention is to provide a new mold for injection molding a sole unto a shoe upper which is economical to use.

A further object is to provide such a mold for producing a shoe in the lower periphery of the sole slopes downwardly and inwardly from and forms a downwardly extending continuation of the peripheral face of the bumper which is desirable when the shoe is worn in playing sports.

A further object is to provide such a mold and method which uses a single sole plate to produce a shoe in which the bumper and an integral first sole part is formed of one color of injection molding material and a second sole part is formed of another color of injection molding material beneath the bumper and first sole part and in which the periphery of the second sole part is visible from the sides and ends of the shoe to provide an attractive two color appearance for the bumper and the second sole part.

A still further object is to provide such a mold and method which produces a skid-resistant surface on the bottom surface of the sole.

Further objects and advantages of this invention will be apparent to persons skilled in the art from the following description taken in conjunction with the accompanying drawings.

As used herein the terms "injection molding material" and "elastomeric solid forming liquid material" mean any and all plastics or plastic like materials embodying characteristics of resiliency and capability of being rendered plastic for a sufficient length of time to be injected into a mold to form the bottom part of a shoe having a textile upper and then caused to set, harden, solidify or otherwise become relatively stable. Suitable materials which may be used to form the bottom part of a shoe are exemplified by, but not limited to, polyvinyl chloride mixtures, rubber, polyurethane mixtures and the like.

In general, a mold embodying this invention comprises longitudinally extending ring plate means which define the mouth of the mold in which a lasted shoe upper may be sealingly engaged, the inner faces of the ring plate means having the contour of the sides of the peripheral portion of the bumper to be molded. It also includes a sole plate the upper surface of which is provided with the design to be formed on the bottom of the sole. The sole plate is adapted for movement towards and away from the bottom of a lasted shoe upper positioned in the mouth of the mold. The ring plate means has a generally concave inner surface at its upper portion. The sole plate comprises a fin extending upwardly about its periphery the inner surface of said fin being generally concave and generally forming a continuation of the lower portion of the generally concave inner surface of the ring plate means when the sole plate is in a lower position and the upper portion of said fin being spaced inwardly from the generally concave inner surface of the ring plate means when the sole plate is in an upper position. This fin forms a peripheral groove adjacent to the lower side of a first sole part which is injection molded when the sole plate is in its upper position and the inner generally concave surface of said fin forms a downwardly extending continuation of the peripheral face of the bumper of the first sole part on a second sole part which is injection molded when the sole plate is in its lower position.

In a preferred embodiment, the ring plate means includes upper and lower transverse channels extending therethrough so that when an injection molding material of one color is passed through the upper channel a bumper and first sole part are formed of that color and when an injection molding material of another color is passed through the lower channel a second sole part is formed of this other color adjacent to the bottom of the bumper and first sole part and the peripheral edge of the second sole part is visible beneath the periphery of the bumper of the first sole part when the shoe is viewed from its sides and ends.

In a preferred embodiment, the inner face of the sole plate fin diverges downwardly from its upper end.

In use of the mold, the upwardly extending peripheral fin of the sole plate forms a peripheral groove adjacent to the lower sides and ends of the first sole part which is molded when said sole plate is in its upper position, and when the second sole part is molded below the first sole part a portion of the second sole part fills the peripheral groove of the first sole part.

In one embodiment the ring plate means comprises upper and lower transverse channels extending therethrough and elastomeric solid forming liquid material of one color is injected through the upper channel to form a combined bumper and first sole part of one color and elastomeric solid forming liquid material of another color is injected through the lower transverse channel, whereby a second sole part is formed of this other color adjacent to the bottom of the bumper and the first sole part which is visible beneath the periphery of the bumper of the first sole part when the shoe is viewed from its sides and ends.

In one embodiment, the inner face of the sole plate fin diverges downwardly from its upper end.

In the preferred embodiment the sole plate fin forms a peripheral groove adjacent to the sides and ends of the first sole part and when the second sole part is molded below the first sole part a portion of the second sole part fills this peripheral groove.

It will be apparent to persons skilled in the art that this invention has solved the above described, long-felt need and satisfied the above described objects.

DETAILED DESCRIPTION OF THE INVENTION

Figure 1:
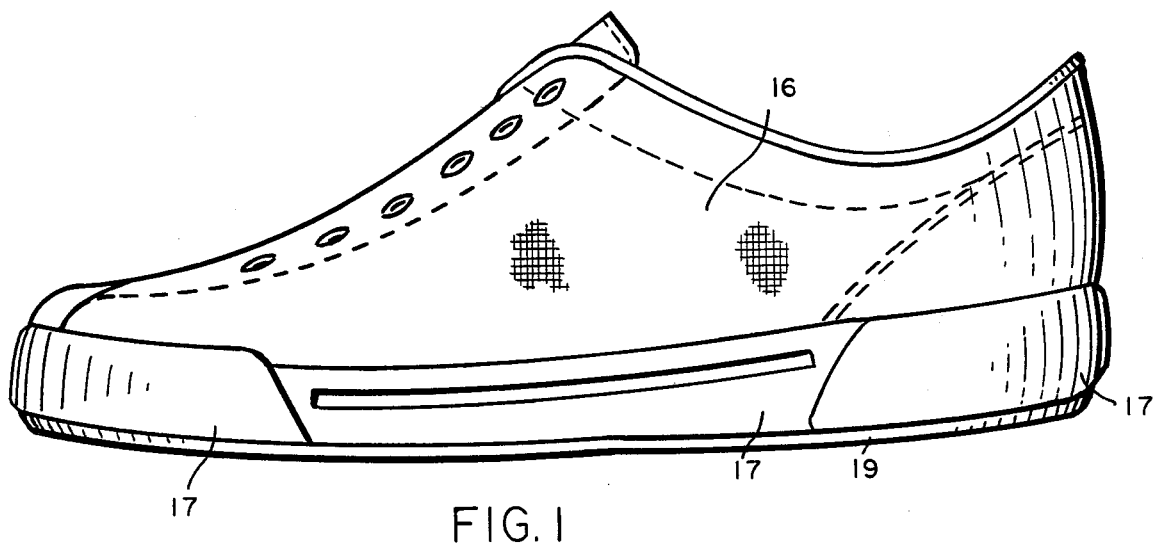
FIG. 1 is a side elevation of a shoe made by a mold embodying the invention.

A shoe made by a mold embodying this invention is shown in FIGS. 1 through 4 and 13 of the drawings. The shoe comprises an upper 16, a bumper 17 which is integral with a first sole part 18 and a second sole part 19 which has an upwardly extending member 19A which extends into a peripheral groove 17A in the bumper and the first sole part. The peripheral face of the second sole part forms a downwardly extending continuation of the peripheral face of the bumper and it is visible from the sides and ends. In a preferred embodiment, the bumper and first sole part is molded from an injection molding material of one color, for example white, and the second sole part is molded from an injection molding material of another color, for example blue, thus providing an attractive appearance for the completed shoe.

The bottom of the second sole part is provided with a skid-resistant surface which includes raised parts 20 and depressed portions of grooves 21.

Figure 7:
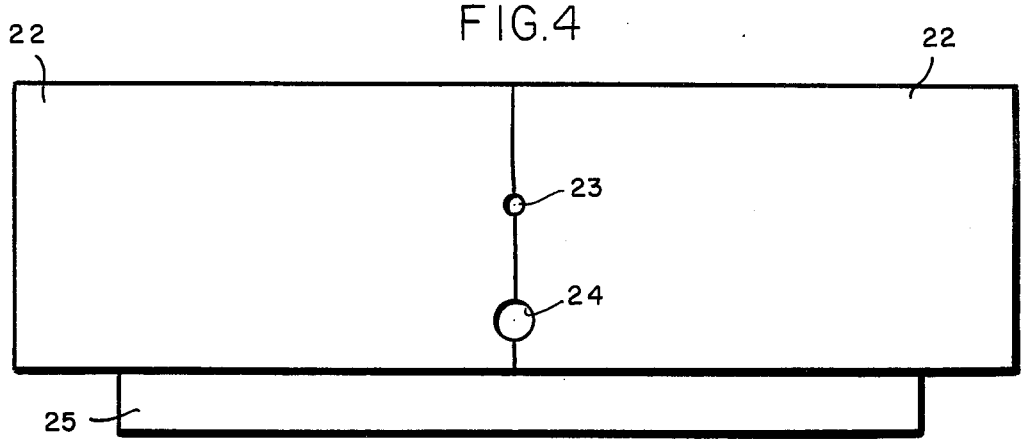
FIG. 7 is an end view of the mold shown in FIG. 6 but with the lasted upper removed.
Figures 5, 6:
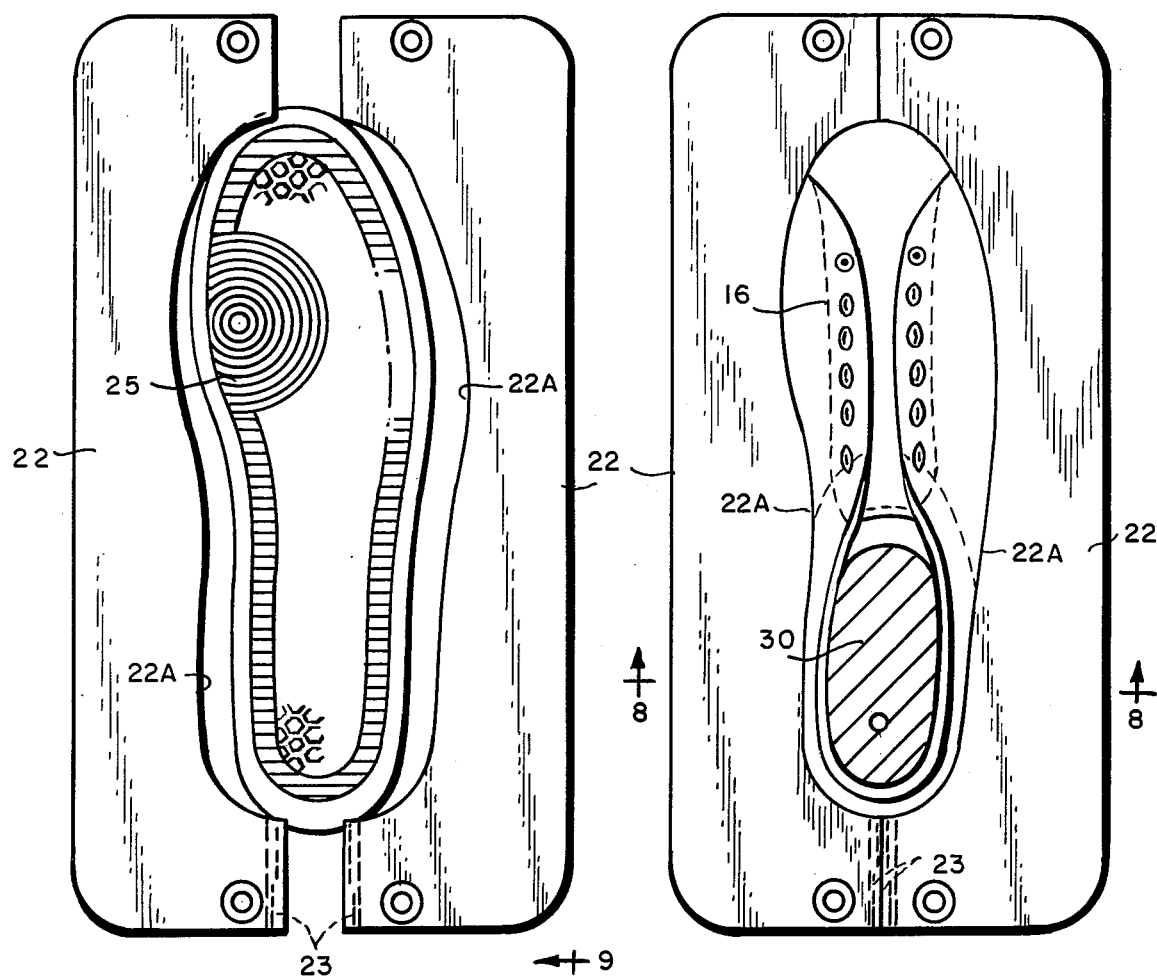
FIG. 5 is a top plan view of a mold embodying the invention showing the ring plate means in open position and the sole plate between the ring plate means.
FIG. 6 is a top plan view of the mold with the ring plate means closed about a lasted upper and the sole plate in an upper position.
Figure 8:
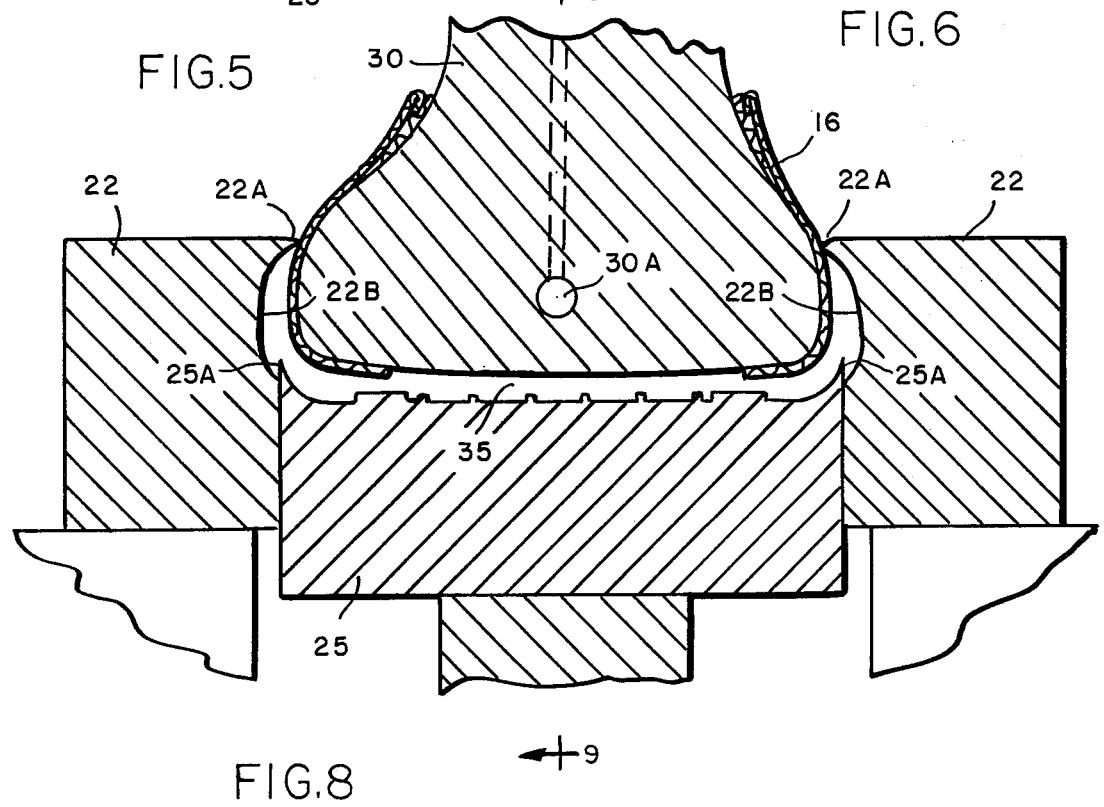
FIG. 8 is an enlarged section taken on the lines 8—8 of FIG. 6 showing the sole plate in an upper position.

The mold comprises longitudinally extending metal ring plate means 22 which are movable away from each other to the position shown in FIG. 5 and towards each other to the position shown in FIGS. 6, 7 and 8.

Upper and lower transverse channels 23 and 24 are provided which extend through the ring plate means when they are in the closed positions shown in FIGS. 7 and 9 through 13.

Figure 2:
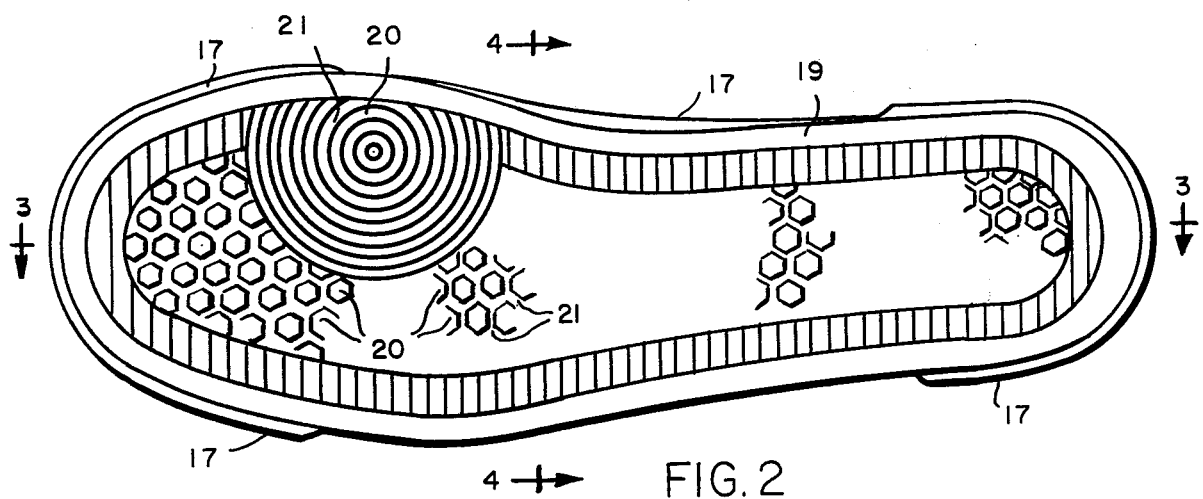
FIG. 2 is a bottom plan view of the shoe of FIG. 1 showing the outer sole and the lower peripheral edge of the bumper portion of the shoe.
Figure 11:
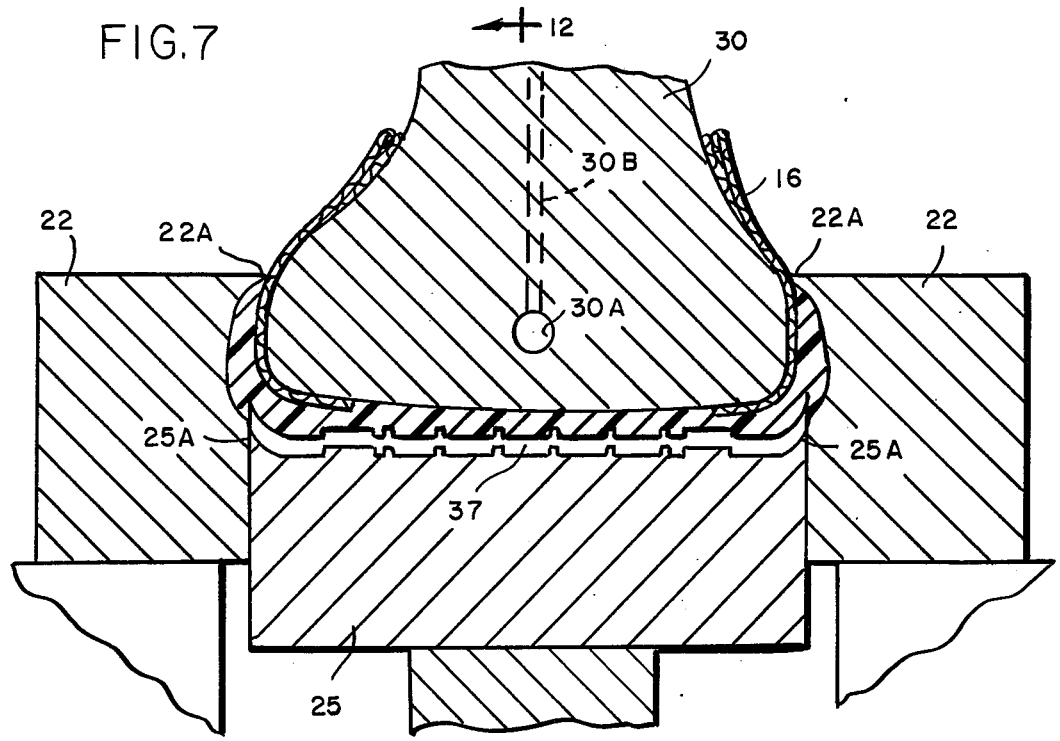
FIG. 11 is a section like FIG. 8 but showing the sole plate moved to a lower position ready for injection molding a second sole part.
Figure 9:
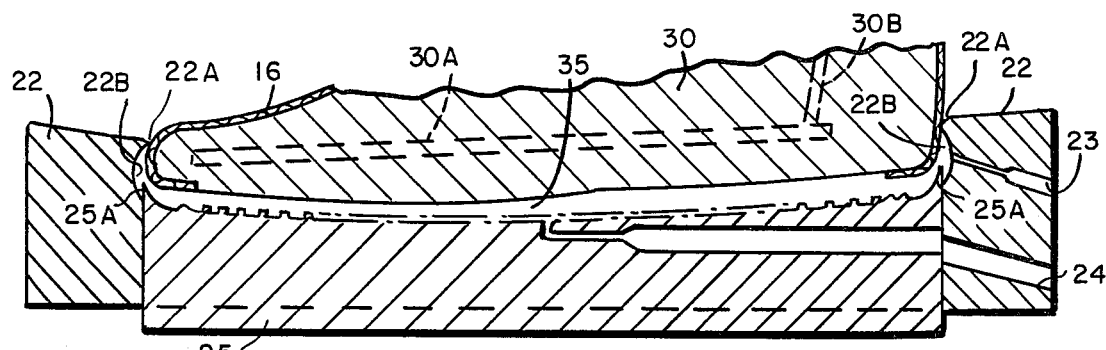
FIG. 9 is a fragmentary section taken on the lines 9—9 of FIG. 8.
Figure 10:
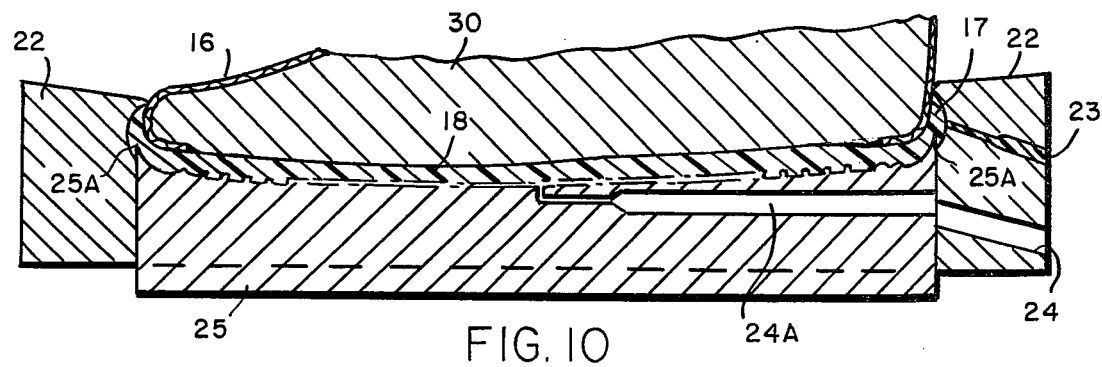
FIG. 10 is a section like FIG. 9 but showing a combined bumper and first sole part injection molded in the mold cavity.
Figure 12:
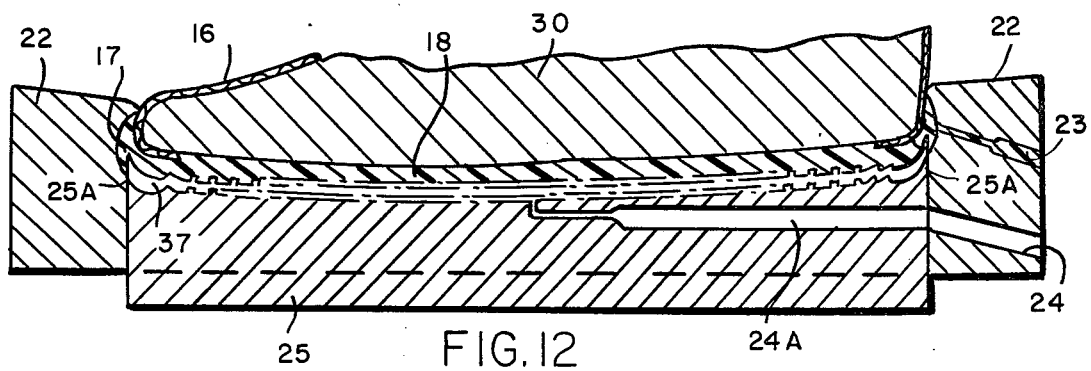
FIG. 12 is a fragmentary section taken on the line 12—12 of FIG. 11.
Figure 13:
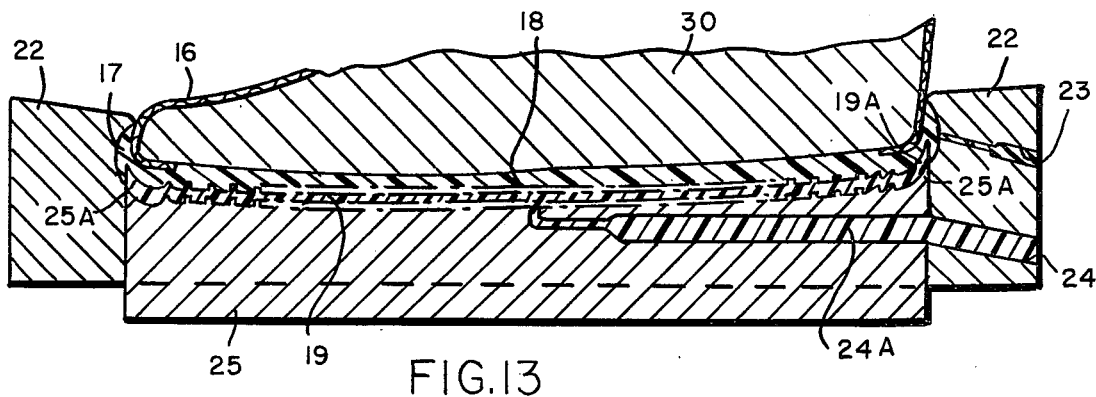
FIG. 13 is a section like FIG. 12 but showing a second sole part injection molded below the combined bumper and first sole part.

The mold also comprises a metal sole plate 25 which is movable to the upper position shown in FIGS. 8, 9 and 10 and to the lower position shown in FIGS. 11, 12 and 13. The sole plate is provided with an upper surface which is capable of forming the skid-resistant surface of the bottom of the second sole part as shown in FIGS. 2 and 5.

The sole plate also comprises a fin 25A which extends upwardly about its entire periphery.

Each of the two ring plate means includes a lip 22A and these lips engage the upper 16, at least the lower portion of which extends beneath a last 30 as shown in FIGS. 8 and 9 through 13. The last is made of metal, it contains en electric heating element 30A and a passage 30B through which electric wiring extends to the heating element.

The ring plate means and sole plate are also provided with heating elements (not shown) as is well known in the prior art.

The inner faces 22B of the ring plate means are generally concave and have the contour of the peripheral portion of the bumper 17 which is to be molded.

As shown in FIGS. 8, 9 and 10, when the sole plate is in its upper position, its peripheral fin 25A is spaced inwardly from the generally concave inner surface 22B of the ring plate means. As shown in FIGS. 11, 12 and 13, when the sole plate is in its lower position, the generally concave inner surface of this peripheral fin 25A generally forms a continuation of the lower portion of the generally concave surface 22B of the ring plate means. The inner face of the sole plate fin diverges downwardly from its upper end.

When the sole plate is in its upper position of FIGS. 8 and 9, a cavity 35 is formed by the lasted upper, ring plate means and sole plate which corresponds to the combined bumper 17 and first sole part 18. With these elements in such positions, injection molding material is injected through the upper transverse channel 23 filling the cavity. Then the injection molding material is permitted to at least partially set thus forming the combined bumper 17 and first sole part 18 which are adhered to the upper as shown in FIGS. 10, 3 and 4.

Then the sole plate is lowered to the position shown in FIGS. 11 and 12 thus forming a cavity 37 between the upper surface of the sole plate and the bottoms of the combined bumper and first sole part. In that position, the lower transverse channel 24 and its extension 24A communicate with the cavity 37. Then injection molding material is injected through the channels 24 and 24A into the cavity 37 and permitted to at least partially set thus forming the second sole part 19, 19A which is adhered to the bumper and the first sole part as shown in FIG. 13.

It is to be noted that the injecting molding material of the second sole part extends into the peripheral groove of the first sole part and that a downwardly extending continuation of the peripheral face of the bumper of the first sole part is formed completely around the sole of the shoe.

Figure 3:
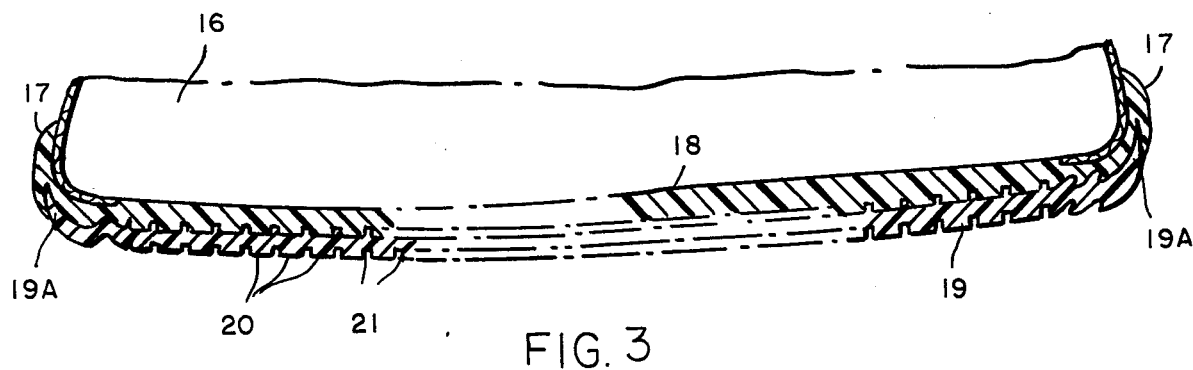
FIG. 3 is a section on the line 3—3 of FIG. 2 broken away to show only the lower part of the textile upper.
Figure 4:
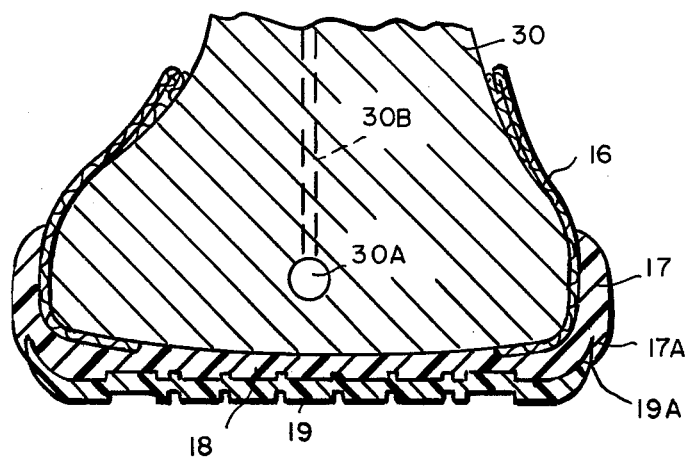
FIG. 4 is a section on the line 4—4 of FIG. 2.

The peripheral edge of the second sole part slopes downwardly and inwardly as shown in FIGS. 3 and 4. This is a desirable construction for a shoe which is to be worn in playing sports.

The manufacture of shoes using a mold embodying this invention is very economical because only about 1 minute and 37 seconds are required to injection mold the bumper and first sole part and about 2½ seconds to mold the second sole part. This can be accomplished because only one sole plate is required and it is only necessary to move the sole plate downwardly a very short distance to mold the second sole part.

Suitable temperatures are as follows:
injection molding material from about 380° to about 400° C.;
bottom of the last from about 100° C. to about 150° C.;
ring means and sole plate from about 90° to about 100° C.

Other temperatures are suitable depending upon the injection molding material used as will be apparent to persons skilled in the art.

It will be apparent to persons skilled in the art that the mold of this invention satisfies the long-felt need and the objects of the invention as stated above.

While one desirable embodiment of a mold which embodies the invention have been shown and described in the specification, it is to be understood that this disclosure is for the purpose of illustration only and that various changes in shape, proportion and arrangement of parts as well as the substitution of equivalent elements for those shown and described herein may be made without departing from the spirit and scope of the invention as set forth in the appended claims.

I claim:

1. In a mold for injection molding a sole onto an upper, the mold comprising longitudinally extending ring plate means which define the mouth of the mold in which a lasted shoe upper may be sealingly engaged, the inner faces of said ring plate means having the contour of the sides of the peripheral portion of the bumper to be molded, and a sole plate the upper surface of which is provided with the design to be formed on the bottom of the sole, said sole plate being adapted for movement towards and away from the bottom of a lasted shoe upper positioned in the mouth of the mold, the improvement comprising, the ring plate means having a generally concave inner surface at its upper portion and the sole plate compirising a fin extending upwardly about its periphery, the inner surface of said fin being generally concave and generally forming a continuation of the lower portion of said generally concave inner surface of the ring plate means when the sole plate is in a lower position and the upper portion of said fin being spaced inwardly from said generally concave inner surface of the ring plate means when the sole plate is in an upper position, whereby said fin forms a peripheral groove adjacent to the lower side of a first sole part which is injection molded when the sole plate is in said upper position and the inner generally concave surface of said fin forms a downwardly extending continuation of the peripheral face of the bumper of the first sole part on a second sole part which is injection molded when the sole plate is in said lower position.

2. A mold according to claim 1 wherein the ring plate means comprises upper and lower transverse channels extending therethrough, whereby when an injection molding material of one color is passed through said upper channel said bumper and first sole part are formed of said one color, and when an injection molding material of another color is passed through said lower channel, said second sole part is formed of said another color adjacent to the bottom of said bumper and first sole part and the peripheral edge of said second sole part is visible beneath the periphery of the bumper of said first sole part when the shoe is viewed from its sides and ends.

3. A mold according to claim 1 wherein the inner face of said sole plate fin diverges downwardly from its upper end.

4. A mold according to claim 1 wherein said upwardly extending peripheral fin of the sole plate forms a peripheral groove adjacent to the lower sides and ends of the first sole part which is molded when said sole plate is in said upper position, and when the second sole part is molded below said first sole part a portion of said second sole part fills said peripheral groove of the first sole part.

* * * * *

UNITED STATES PATENT AND TRADEMARK OFFICE
CERTIFICATE OF CORRECTION

PATENT NO. : 4,120,477
DATED : October 17, 1978
INVENTOR(S) : Juan Justamante

It is certified that error appears in the above-identified patent and that said Letters Patent are hereby corrected as shown below:

Col. 1, line 3, change "on" to --or--;

Col. 2, line 24, after "in" insert --which--; and

Col. 4, line 48, change "of" to --or--.

Signed and Sealed this

Ninth Day of January 1979

[SEAL]

Attest:

RUTH C. MASON
Attesting Officer

DONALD W. BANNER
Commissioner of Patents and Trademarks